United States Patent
Remaley et al.

(10) Patent No.: US 11,556,153 B2
(45) Date of Patent: Jan. 17, 2023

(54) ELECTROSTATIC CLUTCH FOR ACTIVE CONTROL OF FREE HINGE

(71) Applicant: Microsoft Technology Licensing, LLC, Redmond, WA (US)

(72) Inventors: Jacquelin Leah Remaley, Redmond, WA (US); James David Holbery, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 667 days.

(21) Appl. No.: 16/459,190

(22) Filed: Jul. 1, 2019

(65) Prior Publication Data
US 2021/0004060 A1 Jan. 7, 2021

(51) Int. Cl.
*G06F 1/16* (2006.01)
*H02N 13/00* (2006.01)

(52) U.S. Cl.
CPC .......... *G06F 1/1681* (2013.01); *H02N 13/00* (2013.01)

(58) Field of Classification Search
CPC ...... G06F 1/1681; G06F 1/1679; H02N 13/00
USPC ....................................................... 361/234
See application file for complete search history.

(56) References Cited

U.S. PATENT DOCUMENTS

| 10,481,644 | B1* | 11/2019 | Morrison | G06F 1/1677 |
| 2008/0039009 | A1* | 2/2008 | Symons | G06F 1/1616 |
| | | | | 455/3.06 |
| 2017/0351296 | A1* | 12/2017 | Tan | G06F 1/1681 |
| 2018/0049329 | A1* | 2/2018 | Seo | G06F 1/1652 |
| 2018/0049336 | A1 | 2/2018 | Manuel et al. | |
| 2019/0107157 | A1* | 4/2019 | Schmitz | F16D 13/52 |

FOREIGN PATENT DOCUMENTS

| EP | 3144770 A1 | 3/2017 |
| WO | 2011116357 A2 | 9/2011 |

OTHER PUBLICATIONS

"International Search Report and Written Opinion Issued in PCT Application No. PCT/US20/031241", dated Aug. 19, 2020, 12 Pages.

* cited by examiner

*Primary Examiner* — Thienvu V Tran
*Assistant Examiner* — Sreeya Sreevatsa
(74) *Attorney, Agent, or Firm* — Holzer Patel Drennan (57) ABSTRACT

A hinge mechanism includes an electrostatic clutch for providing active control of a relative angle between two planar components. The hinge mechanism includes two conductive components on opposite sides of a dielectric layer; a relative angle detection mechanism usable to determine a relative angle between the two planar components; and a voltage controller that selectively applies voltage to at least one of the two conductive components when the detected angle between the two planar components satisfies a locking condition, the applied voltage creating an electrostatic force that restricts movement of the two conductive components and fixedly support the two planar components at the detected angle of separation.

20 Claims, 9 Drawing Sheets

View A

View B

ELECTROSTATIC CLUTCH FOR ACTIVE CONTROL OF FREE HINGE

BACKGROUND

A variety of personal electronic devices include planar components designed to removably couple to one another via a hinge-type mechanism and/or provide structural support for use of the electronic device(s) at one or more different positions relative to one another. Existing solutions, such as magnetic clasps, may consume significant surface area and lack the adjustability that some users may desire.

SUMMARY

An electrostatic clutch may be utilized to actively control an angle of separation between two planar components, such as between an electronic device and an accessory for the electronic device. According to one implementation, the hinge mechanism includes two conductive components on opposite sides of a dielectric layer; a relative angle detection mechanism that determines a relative angle between the two planar components; and a voltage controller that selectively applies voltage to one or both of the two conductive components when the detected angle of separation between the two planar components satisfies a predefined condition, the applied voltage being of a magnitude and sign sufficient to create an electrostatic force that restricts relative movement of the two conductive components and fixedly supports the two planar components at the detected angle of separation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

The herein disclosed technology provides a clutch mechanism that utilizes electrostatics to lock together two planar components of an electronic device at a predetermined angle of separation. Locking and unlocking of the clutch mechanism is achieved without the use of magnetics and also while mitigating size of a contact area between external surfaces of the electronic device that serve other functions. In some implementations, the angle of separation is adjustable by varying a setting of the electronic device.

Figure 1:
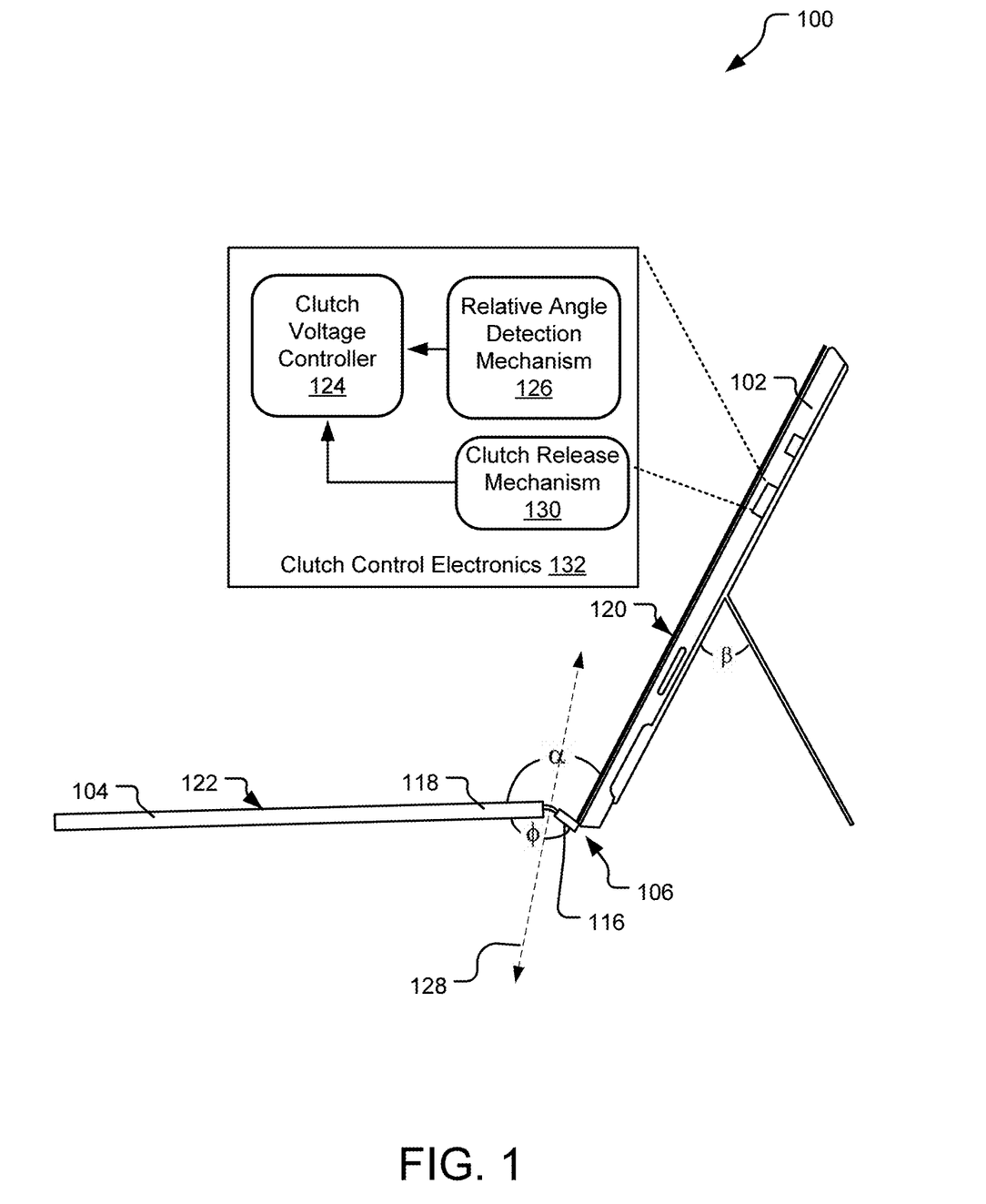
FIG. 1 illustrates an example electronic device that uses an electrostatic clutch to provides active control of an angle of separation between planar surfaces of a first component and a second component.

FIG. 1 illustrates an example electronic device 100 that uses an electrostatic clutch 106 to provide active control of an angle of separation between planar surfaces of a first component 102 and a second component 104. The electrostatic clutch 106 provides active control of a relative angle of separation $\alpha$ between the first component 102 and the second component 104 by creating an electrostatic frictional force between conductive surfaces the electrostatic clutch 106. In FIG. 1, the second component 104 is a keyboard accessory and the first component 102 is a tablet (e.g., display). Although other examples may similarly pertain to keyboard and display systems, it is contemplated that the first component 102 and the second component 104 may assume a variety of different forms (e.g., different types of devices and/or device components) in different systems that implement the electrostatic clutch 106. In one example implementation, the electrostatic clutch 106 is used to secure a kickstand 108 relative to the first component 102. For example, the same electrostatic clutch 106 discussed above with respect to components 102, 104 may similarly be used to secure the kickstand 108 at an angle $\beta$ relative to the first component 102.

The electrostatic clutch 106 controls the separation angle $\alpha$ between the planar surfaces 120, 122 by selectively permitting and restricting rotation about a hinge axis 128, which may assume different forms and locations in different implementations. In FIG. 1, that hinge axis 128 separates different portions of the second component 104 (e.g., the keyboard) from one another. In the implementation of FIG. 1, the second component 104 includes a spine portion 116 that is connected to a main portion 118 about the hinge axis 128. The first component 102 (e.g., the display) is fixedly attached to the spine portion 116 of the second component 104. For example, the second component 104 may be coupled to the spine portion 116 by a physical port coupling, latch, magnet, or other attachment solution that engages independent of the electrostatic clutch 106.

When the electrostatic clutch 106 is in an unlocked state, the spine portion 116 is permitted to flex relative to the main portion 118 about the hinge axis 128, varying a hinge angle $\phi$. Due to the coupling between the first component 102 and the spine portion 116, user-imparted movement to the first component 102 may rotate the attached spine portion 116 about the hinge axis 128 about the hinge angle $\phi$. This movement, in turn, alters the separation angle $\alpha$ between the planar surfaces 120, 122.

The electrostatic clutch 106 is selectively toggled between a locked state and an unlocked state by clutch control electronics 132, which may include hardware or a combination of hardware and software. In FIG. 1, the clutch control electronics 132 are shown as being internal to the first component 102; however, it should be understood that these components may alternatively be included within the second component 104, or distributed between the first component 102 and the second component 104. The clutch control electronics 132 include a clutch voltage controller 124 that selectively locks and unlocks the electrostatic clutch 106 based on inputs received from a relative angle detection mechanism 126.

The relative angle detection mechanism 126 is, in one implementation, a component or subsystem that performs measurements indicative of a current value of the separation angle $\alpha$. For example, the relative angle detection mechanism 126 may include a bend sensor or a strain sensor that the measures, detects, or otherwise collects data usable to dynamically determine the separation angle $\alpha$, such as in response to a user's manipulation of the current physical configuration of the electronic device 100. When the separation angle $\alpha$ satisfies a predefined locking condition, the clutch voltage controller 124 supplies voltage to one or more electrodes on portions of the electrostatic clutch 106 to generate an electrostatic force that effectively locks the main portion 118 relative to the spine portion 116, preventing all movement above the hinge axis 128. Locking of the hinge angle $\phi$ in this manner effectively fixes the separation angle $\alpha$ between the planar surfaces 120, 122.

Notably, the relative angle detection mechanism 126 may, in some implementations, perform measurements usable to derive the separation angle $\alpha$ in lieu of direct measurement. For example, the relative angle detection mechanism 126 may be operable to detect the hinge angle $\phi$ from which the separation angle $\alpha$ may be dynamically calculated, looked up in a table, or otherwise determined. In some implementations, such as those shown in FIG. 5, the separation angle $\alpha$ is the same as hinge angle $\phi$.

In some implementations, a user may selectively configure a device setting that sets the hinge angle $\phi$ and/or the separation angle $\alpha$ at which the electrostatic clutch automatically enters the locked state. For example, the user may electronically access a control panel of the electronic device 100 and select from various keyboard angle options (e.g., keyboard flat against a desk, angled slightly, angled dramatically) to set the hinge angle $\phi$ and the separation angle $\alpha$.

In addition to those components discussed above, the clutch control electronics 132 also include a clutch release mechanism 130 for the electrostatic clutch 106. In one implementation, the release mechanism includes a button that, when pushed, causes the clutch voltage controller 124 to switch off the supply of voltage to the components of the electrostatic clutch 106. In other implementations, the release mechanism includes a force sensor coupled to the clutch voltage controller 124. When the force sensor registers a separation force of predetermined magnitude (e.g., a pulling of the second component 104 away from the first component 102), the clutch voltage controller 124 switches off the supply of voltage to the electrostatic clutch 106. Further example features of the electrostatic clutch 106 are discussed in greater detail with respect to FIG. 2-7, below.

Figure 2:
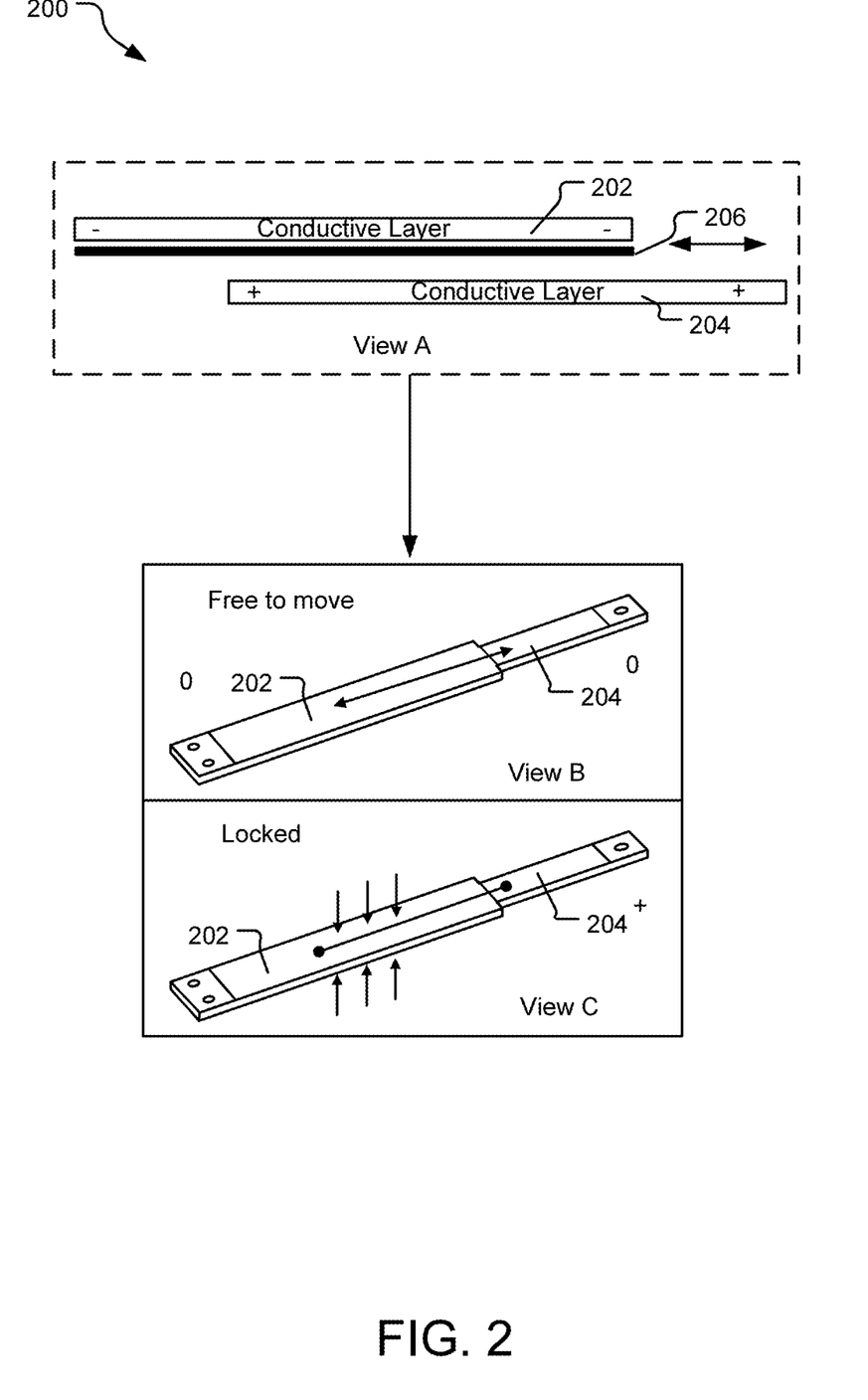
FIG. 2 illustrates exemplary components of an electrostatic clutch that may be integrated within an electronic device to provide active control of a relative angle of separation between two planar components.

FIG. 2 illustrates exemplary components of an electrostatic clutch 200 that may be integrated within an electronic device to provide active control of a relative angle of separation between two planar components (not shown). As shown in View A, the electrostatic clutch 200 includes two conductive components 202, 204 that are elongated in shape and that rest in direct contact with opposite sides of a dielectric material 206. In one implementation, the dielectric material 206 is a coating on a surface of one or both of the two conductive components 202, 204. If, for example, the conductive component 204 is designed to rest partially below the component 202 (as shown), the dielectric material may coat the upper-facing side of the component 204 and/or the downward-facing side of the component 202.

When voltage is not applied to the two conductive components 202 and 204, the two components are free to move relative to one another, such as in the direction of arrows shown in View B. However, when predetermined voltages of opposite sign (e.g., positive and negative) are simultaneously applied to the conductive components 202 and 204, an attractive electrostatic force is created, locking the two conductive components 202 and 204 into place relative to one another, as shown in View C. In another implementation, this applied electrostatic force is achieved by selectively applying a positive voltage to one of the two conductive components 202 and 204 while grounding the other one of the two conductive components 202 and 204. As shown with respect to the following figures, this principle can be utilized to within a various types of hinge assemblies to provide active control of a relative angle of separation between any two planar components of an electronic device.

Figure 3:
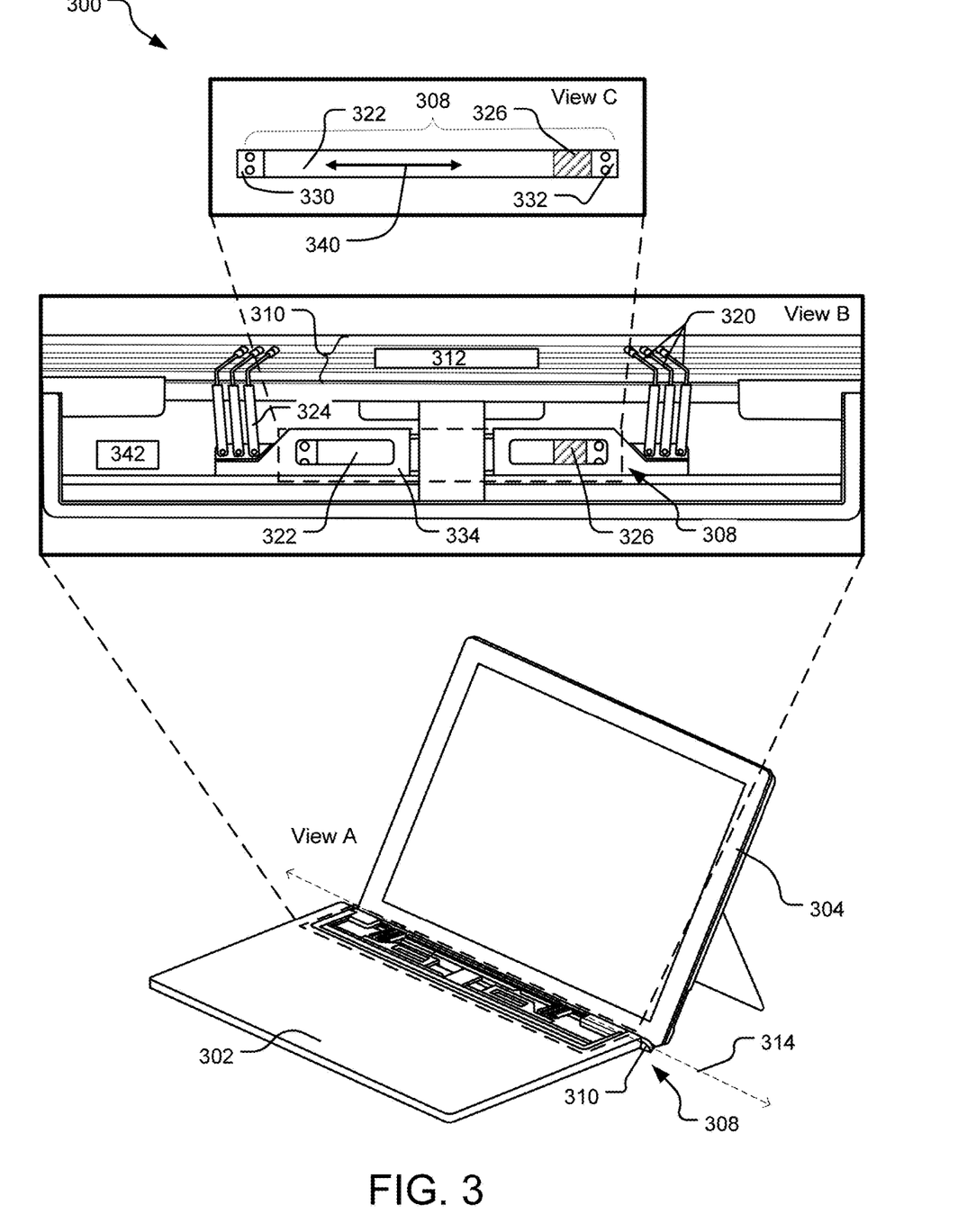
FIG. 3 illustrates an electronic device with an example hinge mechanism that includes an electrostatic clutch to provide active control of a relative angle of separation between a keyboard and a display.

FIG. 3 illustrates an electronic device 300 with an example hinge mechanism 306 that includes an electrostatic clutch 308 to provide active control of a relative angle of separation between a keyboard 302 and a display 304. Three views are shown to illustrate various aspects of the hinge mechanism 306 and the electrostatic clutch 308. View A illustrates a positioning of the hinge mechanism 306 and the electrostatic clutch 308 within architecture of the electronic device 300; View B illustrates a first magnified view of the hinge mechanism 306 and electrostatic clutch 308; and View C illustrates a second magnified view showing the electrostatic clutch 308 in isolation (for clarity) without surrounding components.

The hinge mechanism 306 includes a mid-spine 310 designed to rotate about a hinge axis 314 relative to a hinge assembly 316 that includes the electrostatic clutch 308 and various other components for translating movement of the mid-spine 310 to an upper conductive component 322 of the electrostatic clutch 318.

In the illustrated implementation, the mid-spine 310 is designed to removably couple to the display 304 via a physical coupling 312 located on the mid-spine 310. This physical coupling 312 is independent of the electrostatic clutch 308 and may be accomplished using a variety of different types of coupling mechanisms. In one implementation, the physical coupling 312 includes electrical ports for supplying connections between the display 304 and the keyboard 302. In another implementation, the physical coupling 312 assumes a different form, such as one that does not provide electrical couplings between the display 304 and the keyboard 302. For example, the mid-spine 310 may extend outward beyond that shown, wrapping up and around a portion of the back-side of the display 304, such as to form a flexible or rigid sheath that secures in some manner to the back of the 304. In each of these implementations, the display 304 may be either permanently removably affixed to the mid-spine 310 and configured to rotate along with the mid-spine 310 about the hinge axis 314 relative to the keyboard 302.

Although different implementations may include different mechanisms for translating user-imparted changes in electronic device configuration to positional changes in various components of the electrostatic clutch 308, the hinge mechanism 306 of FIG. 3 includes a number of angled pins 320 that abridge the hinge axis 314 between the mid-spine 310 and the electrostatic clutch 308. Each of the angled pins 320 is set at a fixed angle with a first end attached to the mid-spine 310 and a second end secured within a pin sheath (e.g., a pin sheath 324) coupled to one of two opposing ends of the electrostatic clutch 308. The pin sheaths (e.g., pin sheath 324) are each designed to translate the rotational force of the mid-spine 310 to a force that shifts the upper conductive component 322 of the electrostatic clutch 308 within a slider 334 along a left/right axis 340.

The electrostatic clutch 308 includes two elongated planar components including the upper conductive component 322 and a lower conductive component 326 that at least partially underlies the upper conductive component 322. Overlapping portions of the upper conductive component 322 and the lower conductive component 326 are positioned in contact with opposite sides of a dielectric (not shown). In one implementation, a downward-facing (unexposed) surface of the upper conductive component 322 is coated with a thin layer of dielectric material that contacts an upward-facing surface of the lower conductive component 326. A first electrode 330 is attached to the upper conductive component 322 while and a second electrode 332 is attached to the lower conductive component 326.

In one implementation, the lower conductive component 322 is fixed in position while the upper component 326 is designed to along the left/right axis 340 responsive to translational forces imparted by the angled pins 320. In another implementation, the lower conductive component 322 moves while the upper component 326 remains fixed. In still other implementations, both the upper conductive component 322 and the lower conductive component 326 are adapted to move toward and away from one another responsive to movement of the angled pins 320.

Rotation of the mid-spine 310 upward about the hinge axis 314 imparts a translation of motion through the angled pins 320 causing an end of the pin sheaths most distal to the mid-spine 310 to shift in one of the two directions along the left/right axis 340. This motion, in turn, shifts the upper conductive component 326 in the same direction. Rotation of the mid-spine 310 downward about the hinge axis 314 imparts a similar translation of motion through the angled pins 320 causing an end of the pin sheaths most distal to the mid-spine 310 to shift in the opposite direction (e.g., the other direction indicated by the left/right axis 340). This motion, in turn, shifts the upper elongated conductive component 328 in the direction of the angled pins 320. In this way, movement of the mid-spine 310 is tied to movement of the upper conductive component 322. Restricting movement of the upper conductive component 322 therefore has the effect of restricting motion of the mid-spine 310 about the hinge axis 314.

The hinge assembly 316 includes a relative angle detection mechanism 342 (e.g., a sensor) that collects data indicative of a current bend angle of the mid-spine 310 about the hinge axis 314. In one implementation, the relative angle detection mechanism 342 includes a sensor that directly measures an angle between the display 304 and the keyboard 302. For example, the relative angle detection mechanism 342 is a bend sensor that detects a bend angle between the display 304 and the keyboard 302. In another implementation, the relative angle detection mechanism includes a sensor that measures some property indicative of the angle between the display 304 and the keyboard 302. For example, the relative angle detection mechanism 342 may be a strain sensor that detects a length change in the pins 320 as the pins rotate responsive to movements of the mid-spine 310. In this case, pin strain may be measured to determine a current angle of separation between the display 304 and the keyboard 302.

When data collected by the relative angle detection mechanism indicates that the angle of relative separation between the keyboard 302 and the display 304 satisfies a predefined locking condition, a clutch voltage controller (not shown) applies voltage to one or both of the upper conductive component 322 and to the lower conductive component 326 to create an attractive electrostatic force that effectively locks the upper conductive component 322 and lower conductive component 326 of the electrostatic clutch in place relative to one another preventing further translational movement of the angled pins 320. In one implementation, the clutch voltage controller generates the electrostatic force by applying voltages of predefined, equal magnitude and opposite sign to the upper conductive component 322 and to the lower conductive component 326. In another implementation, the clutch voltage controller generates the electrostatic force by applying a positive voltage to one of the upper conductive component 322 and to the lower conductive component 326 while the other one of the two components is grounded.

In effect, the application of the equal and opposite voltages to the conductive components 322, 326 serves to lock the mid-spine 310 in place relative to the keyboard 302, preventing further movement of the mid-spine 310 about the hinge axis 314.

The magnitude of the voltage applied to the two conductive components 322, 326 to lock the electrostatic clutch 308 may be different in different implementations depending upon factors such as the contact surface area of the upper and lower conductive components interfacing with one another through the dielectric, the specific properties of the dielectric employed, and the strength of desired attractive electrostatic force that is, for the given application, sufficient to fixedly support and lock together the two planar device components (e.g., keyboard and display) and to maintain the position of such components despite application of expected external forces, such as the weight of a user's hands and other forces the device may be subjected to during normal use. According to one implementation, the dielectric is a material with a high dielectric constant, such as Barium Titanate. Other dielectrics with lower dielectric constants may also be suitable provided that a greater operating voltage is employed to generate the electrostatic force within the electrostatic clutch 308. Exemplary suitable dielectrics include without limitation polymeric films, ceramic coatings, and other organic and inorganic composite materials.

Provided that the applied voltage(s) are continuously applied, the electrostatic clutch 308 remains in a locked position. Engagement of a release mechanism, as described with respect to FIG. 1, may cause clutch control electronics to interrupt the voltage supply to the conductive components 322, 326, unlocking the electrostatic clutch 308.

Figure 4:
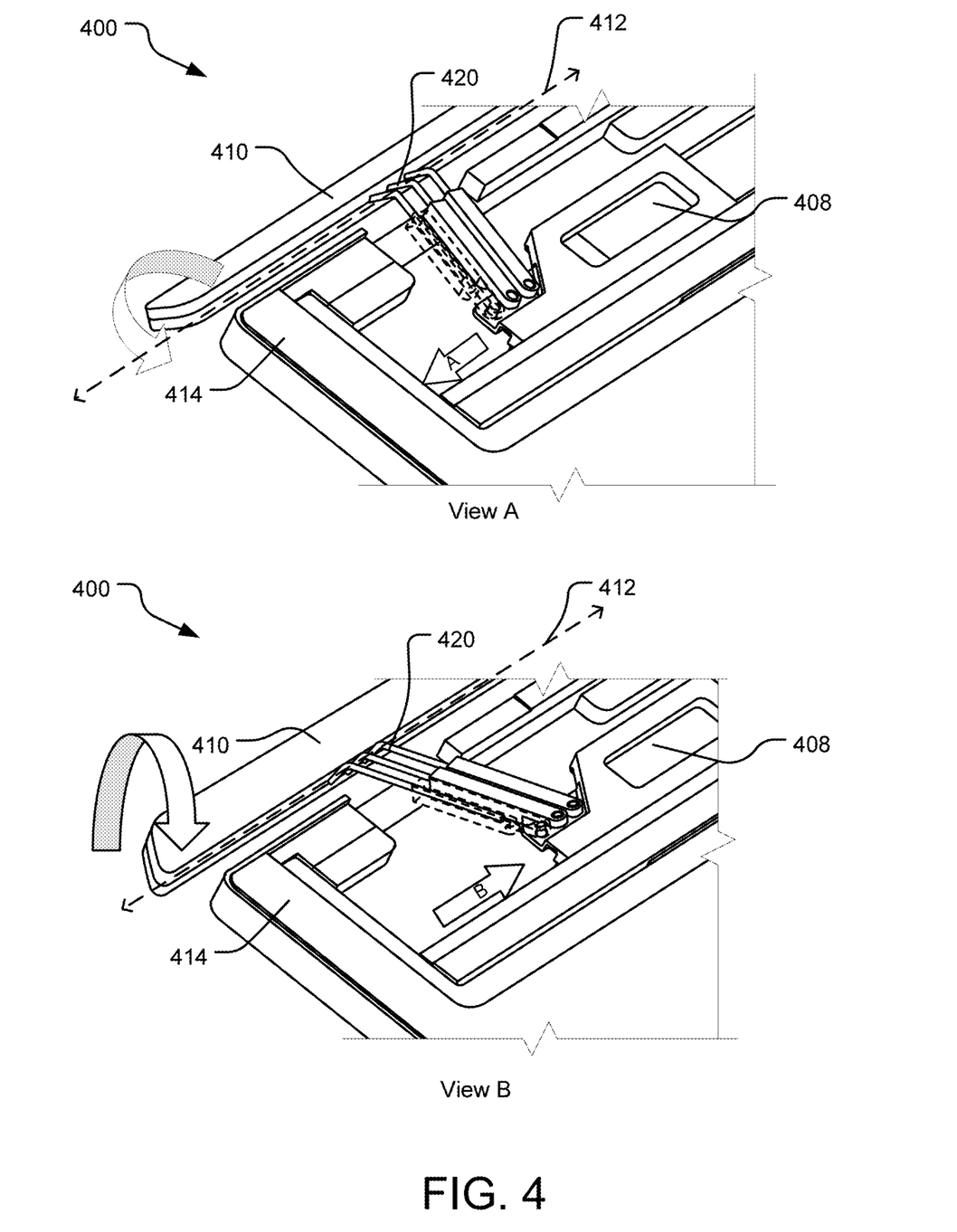
FIG. 4 illustrates exemplary positions of a hinge mechanism that includes an electrostatic clutch that that may be used to selectively lock together two planar components at a predefined angle of separation

FIG. 4 illustrates exemplary positions of a hinge mechanism 400 that includes an electrostatic clutch 408 that that may be used to selectively lock together two planar components at a predefined angle of separation. The hinge mechanism 400 includes a mid-spine 410 that is attached to a main portion 414 via angled pins 420. The main portion 414 includes the electrostatic clutch 408, which may have properties the same or similar to those discussed elsewhere herein. When the electrostatic clutch 408 is in an unlocked state, the mid-spine 410 may be freely rotated in first and second directions about a bend axis 412. In one implementation, the electrostatic clutch 408 includes two stacked elongated conductive components positioned on opposite sides of a dielectric (e.g., as illustrated with respect to conductive components 202, 204, and dielectric material 206 of FIG. 2).

View A of FIG. 4 illustrates movement of the mid-spine 410 in a first direction (e.g., downward around the bend axis 412) and a corresponding translation of this motion that is imparted to the angled pins 420, effecting a shifting of the pins in a first direction, shown by arrow A. This movement effects a motion of an upper conductive component of the electrostatic clutch 408 in the first direction relative to a lower conductive component (not shown).

View B of the FIG. 4 illustrates movement of the flexible mid-spine in a second direction (e.g., upward around the hinge axis) and the corresponding translation of this motion that is imparted to the angled pins 420, effecting a shifting of the pins in a second direction, as shown by arrow B. This movement effects a motion of the upper conductive component of the electrostatic clutch 408 in the second direction (e.g., opposite to the first direction).

Although not shown, the hinge mechanism 400 includes a relative angled detection mechanism that detects positional information, such as changes in strain or length of the angled pins 420. A clutch voltage controller (not shown) uses information detected by the relative angled detection mechanism to determine an angle of the mid-spine 410 relative to the bend axis 412. In some implementations, this angle may equal or be indicative of a separation angle between other planar surfaces of an electronic device including the hinge mechanism 400, such as in the manner discussed above with respect to FIGS. 1-3. When the determined angle of separation between the mid-spine 410 and the main portion 414 satisfies a locking condition, a clutch voltage controller (not shown) applies predefined voltage to one or both of the two conductive components of the electrostatic clutch 408, creating an attractive electrostatic force that prevents further relative motion between the two conductive components. This, in turn, restricts motion of the angled pins 420, effectively locking the mid-spine 410 in place at the detected angle.

In one implementation, the angled pins 420 are permanently bent at an angle that maximizes the translation of motion between the mid-spine 410 and the upper conductive component of the electrostatic clutch 408. For example, the angle is selected such that a movement of the mid-spine 410 about the bend axis 412 results in a greatest possible shift in the position of the upper conductive component relative to the lower conductive component in the electrostatic clutch 408. Although other angles are contemplated and suitable, this angle is in one implementation selected to be 112 degrees.

Figure 5:
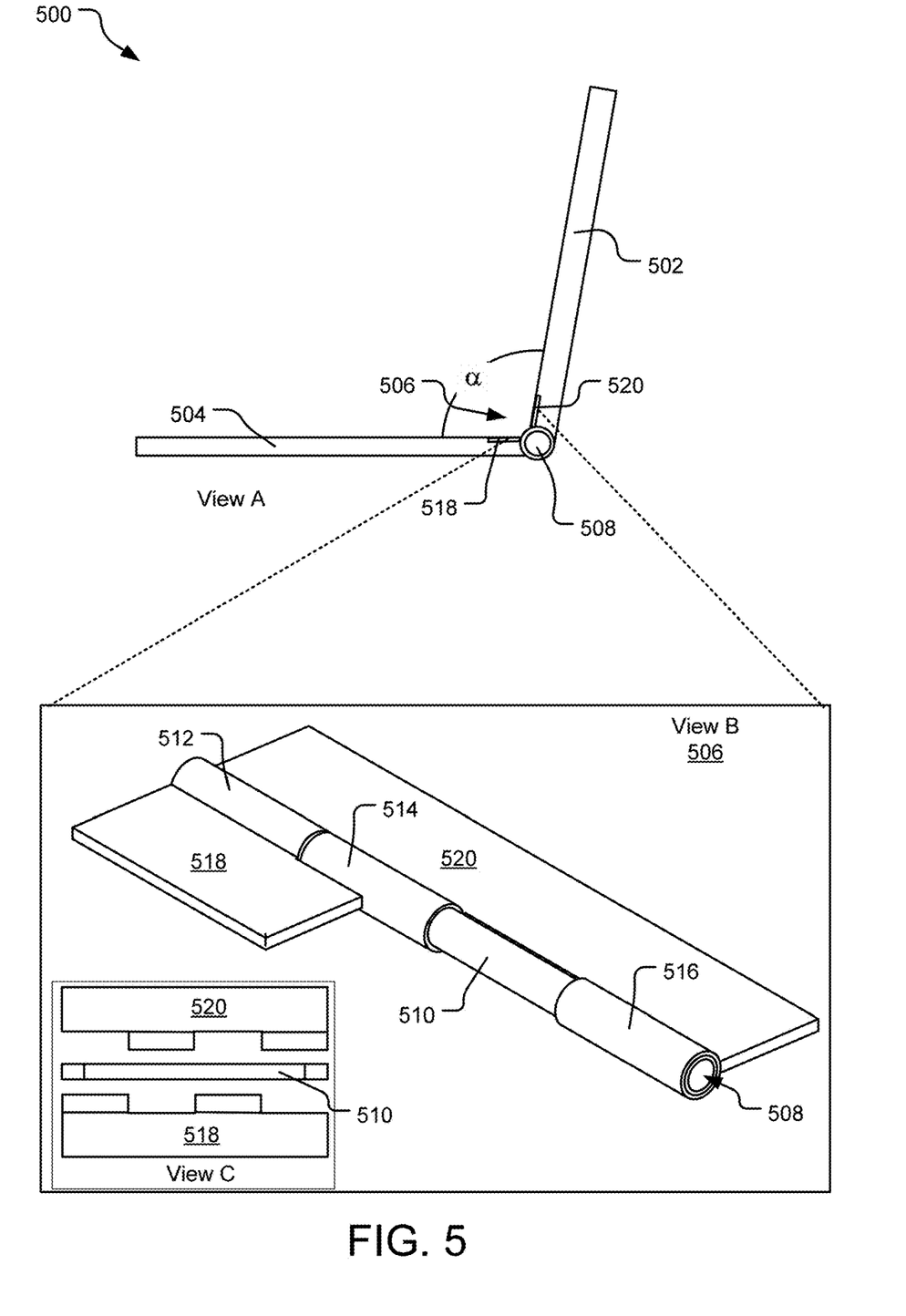
FIG. 5 illustrates another example electronic device with an example hinge mechanism that utilizes an electrostatic clutch to provide active control of a relative angle of separation between a two planar components

FIG. 5 illustrates another example electronic device 500 with an example hinge mechanism 506 that utilizes an electrostatic clutch 508 to provide active control of a relative angle of separation between a two planar components (e.g., a keyboard 504 and a display 502). View A illustrates positioning of the hinge mechanism 506 relative to components of the electronic device. The hinge mechanism 506 includes a conductive cylindrical pin 510 designed to rest within one or more conductive cylindrical sheaths 512, 514, 516 that are each attached to a corresponding supporting flange 518, 520. As shown in View A, each of the supporting flanges 518, 520 is attached to one of the two planar components (e.g., display 502 or keyboard 504) of the electronic device 500 that is supported by and attached to the hinge mechanism 506. In one implementation, the supporting flanges 518, 520 are rigid structurally supportive features.

According to one implementation, a thin layer of dielectric is included at an interface between the conductive cylindrical pin 510 and the conductive cylindrical sheaths 512, 514, 516. For example, the conductive cylindrical pin 510 and/or the interior of the conductive cylindrical sheaths 512, 514, 516 may have a dielectric coating. Together, the conductive cylindrical pin 510, the conductive cylindrical sheaths 512, 514, 516, the dielectric, clutch control electronics (not shown) form an electrostatic clutch 508 that actively controls a separation angle between the keyboard 504 and the display 502.

When the electrostatic clutch 508 is in an unlocked state, there is no voltage applied to the conductive cylindrical pin 510 or the conductive cylindrical sheaths 512, 514, and 516. In this state, the conductive cylindrical sheaths 512, 514, 516 may freely rotate relative to the conductive cylindrical pin 510 to permit movement of the display 502 relative to the keyboard 504.

When clutch control electronics (not shown) selectively provide predefined voltages to one or both of the conductive cylindrical pin 510 and one or more of the conductive cylindrical sheaths 512, 514, 516 the electrostatic clutch 508 enters a locked state due to the resulting generation of a strong attractive electrostatic force at the interface between these conductive components. So long as the voltages are continuously applied to the conductive cylindrical pin 510 and the conductive cylindrical sheaths 512, 514, and 516, this force acts to prevent movement of the conductive cylindrical sheaths 512, 514, 516 relative to the conductive cylindrical pin 510. In one implementation, the attractive electrostatic force is created by applying a positive voltage to the cylindrical pin 510 and grounding one or more of the cylindrical sheaths 512, 514, and 516 (or vice versa). In another implementation, the electrostatic force is created by applying a first voltage to the cylindrical pin 510 and a second voltage of equal magnitude and opposite sign to the cylindrical sheaths 512, 514, and 516.

View B is a perspective view showing the hinge mechanism 506 in greater detail. This view omits a portion of the flange 518 for clarity of concept. View C is a top-down view of the hinge mechanism 506 in a disassembled state.

Although not shown, the computing device 500 additionally includes a relative angle detection mechanism operable to actively detect a separation angle α between planar surfaces of the keyboard 504 and the display 502. In one implementation, the relative angle detection mechanism is a bend sensor (e.g., as discussed with respect to FIG. 3). In another implementation, the relative angle detection mechanism is a strain gauge. In yet still another implementation, the relative angle detection mechanism is a capacitive sensor that measures capacitance between the cylindrical pin 510 and one or more of the conductive cylindrical sheaths 512, 514, and 516. If, for example, an interior section of the dielectric coating does not cover the entire cylindrical pin 510, the relative capacitance generated by the overlapping area can be directly measured and interpreted to obtain angle the angle of separation α.

When this detected separation angle α satisfies a predefined locking condition, the clutch control electronics toggle the electrostatic clutch 508 into the locked state, as described above. The clutch control electronics may also include a release mechanism, as described elsewhere herein, for switching the electrostatic clutch 508 back into the unlocked state.

Figure 6:
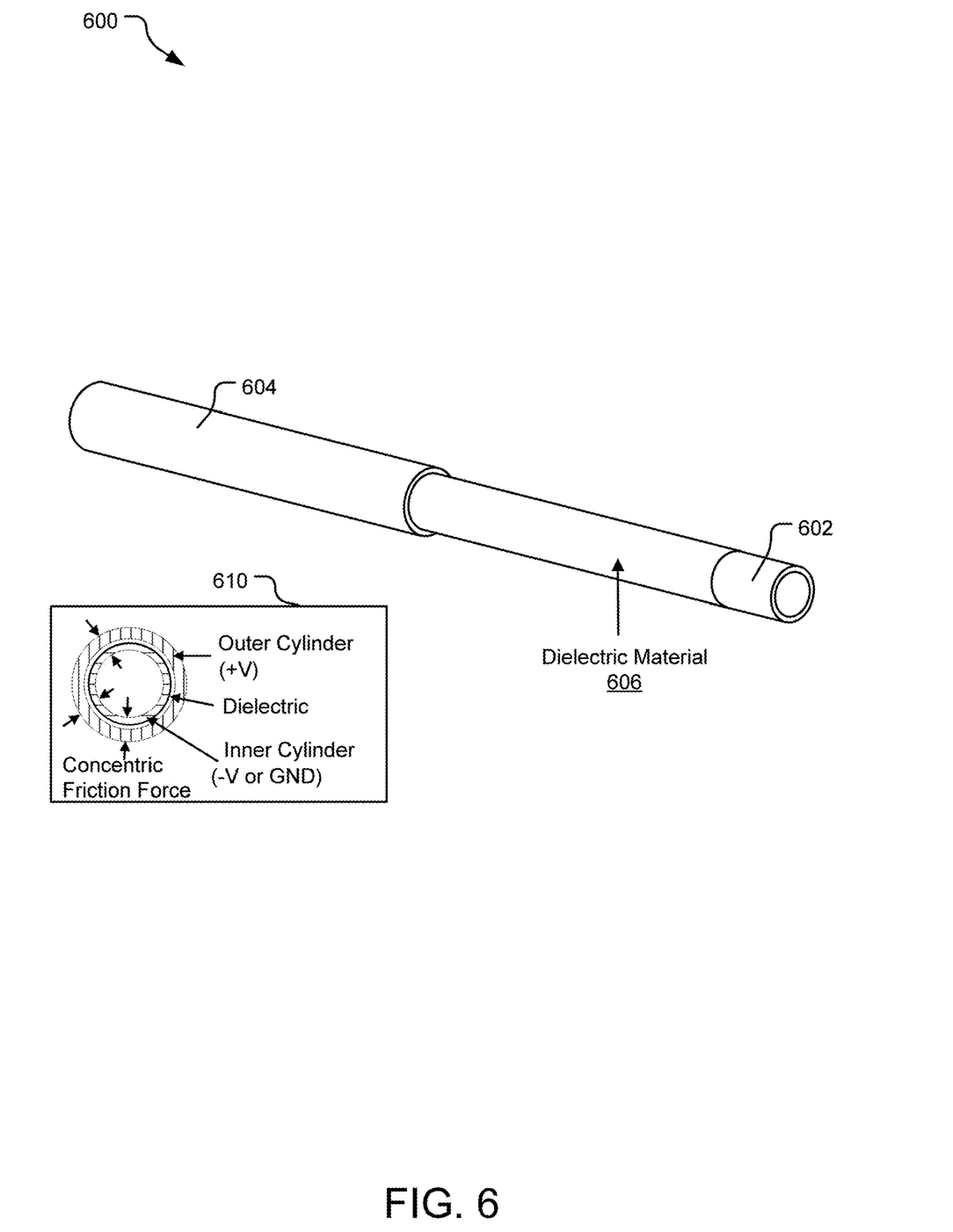
FIG. 6 illustrates additional aspects of an example cylindrical electrostatic clutch the same or similar to that shown and described with respect to FIG. 5.

FIG. 6 illustrates aspects of an example cylindrical electrostatic clutch 600 the same or similar to that shown and described with respect to FIG. 5. The cylindrical electrostatic clutch 600 includes an inner conductive cylinder 602 and an outer conductive cylinder 604. The inner conductive cylinder 602 is coated with a thin layer of dielectric 606. In one implementation, the inner conductive cylinder 602 is freely rotatable relative to the outer conductive cylinder 604 when the cylindrical electrostatic clutch 600 is in an unlocked state.

In one implementation, the electrostatic clutch 600 is selectively toggled into a locked state (e.g., as described above with respect to the electrostatic clutch 508 in FIG. 5) by applying a predetermined positive voltage-to the inner conductive cylinder 602 while the outer conductive cylinder 604 is connected to ground, as shown in the key 610. In another implementation, the electrostatic clutch 600 is selectively toggled into the locked state by applying predetermined voltages of equal magnitude and opposite sign (e.g., −V and +V) to the inner conductive cylinder 602 and to the outer conductive cylinder 604.

The magnitude of the applied voltage is sufficient to generate a concentric friction force (also illustrated in key 610) that prevents movement of the inner conductive cylinder 602 relative to the outer conductive cylinder 604 responsive to a range of forces, such as those expected by a user pulling or pushing on a various device components coupled to the electrostatic clutch. So long as this predetermined voltage is consistently applied, the electrostatic clutch 600 remains in the locked state.

Figure 7:
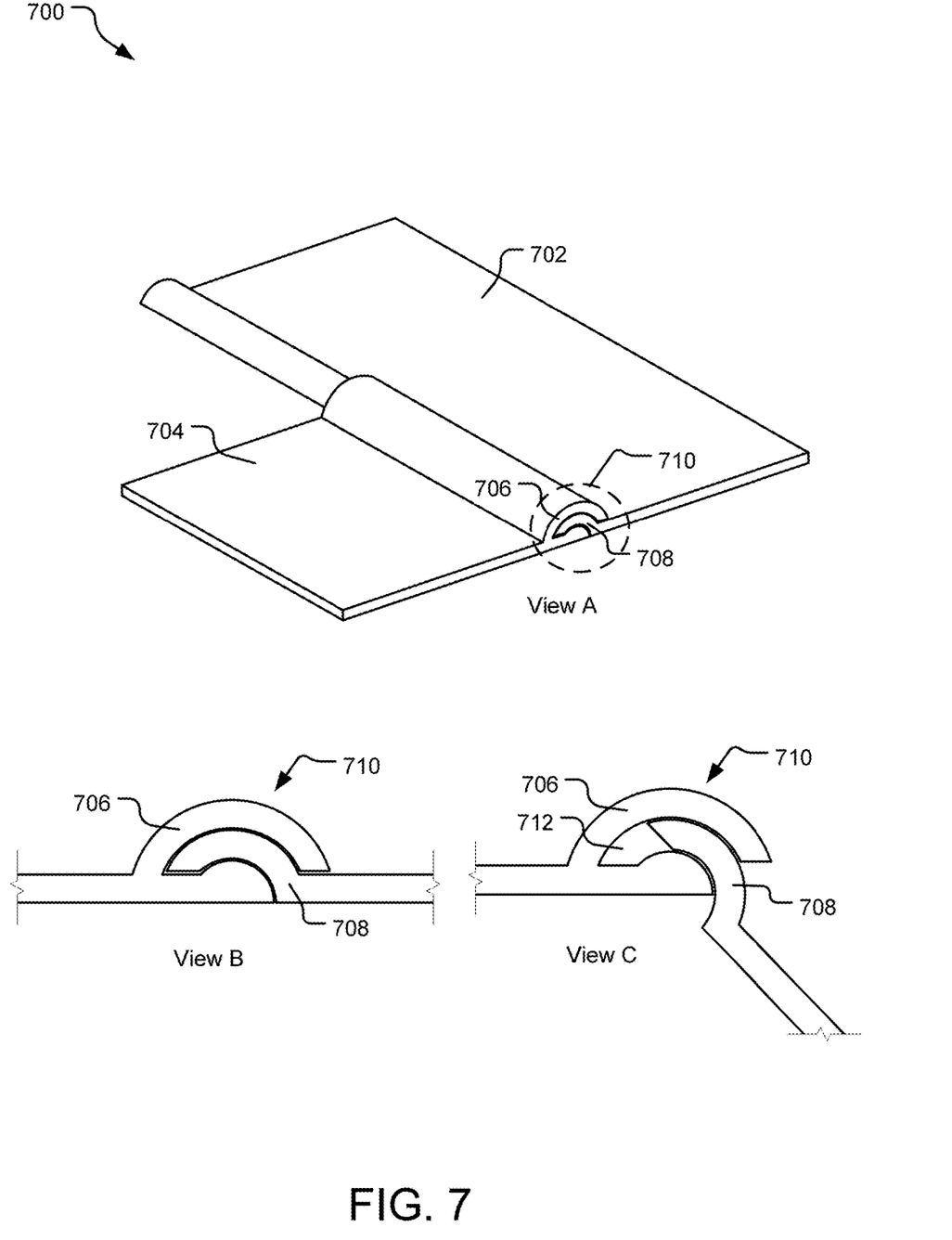
FIG. 7 illustrates aspects of yet another hinge mechanism including an electrostatic clutch that may be used to provide active control of a relative angle of separation between two planar components in an electronic device.

FIG. 7 illustrates aspects of yet another hinge mechanism 700 including an electrostatic clutch 710 that may be used to provide active control of a relative angle of separation between two planar components in an electronic device. The hinge mechanism 700 includes two generally planar conductive components 702 and 704 with hemispherical end portions 706, 708 that are shaped and sized to nest together, as shown in View A. The hemispherical end portion 708 of the conductive component 702 includes a curved notch 712 that is shaped to receive and rest in contact with the hemispherical portion 706 of the conductive component 704. A layer of dielectric (not shown) is included at the interface between the hemispherical end portions 706, 708 such that the conductive surfaces facing one another are each in contact with the dielectric layer. Views B and C of FIG. 7 illustrate different mechanical configurations of the electrostatic clutch 710 as the separation angle is varied between planar portions of the conductive components 702 and 704.

When the electrostatic clutch 710 is in an unlocked state, there is no voltage applied to the conductive components 702, 704. In this state, the two conductive components 702, 704 are free to rotate relative to one another as shown in Views B and C. When control electronics (not shown) selectively provide voltages of a predetermined magnitude and opposite sign to the two conductive components 702, 704, the electrostatic clutch 710 enters a locked state due to the resulting generation a strong frictional force at the interface between these conductive components. Other aspects of the electrostatic clutch 710 may be the same or similar to those described elsewhere herein with respect to other figures.

Figure 8:
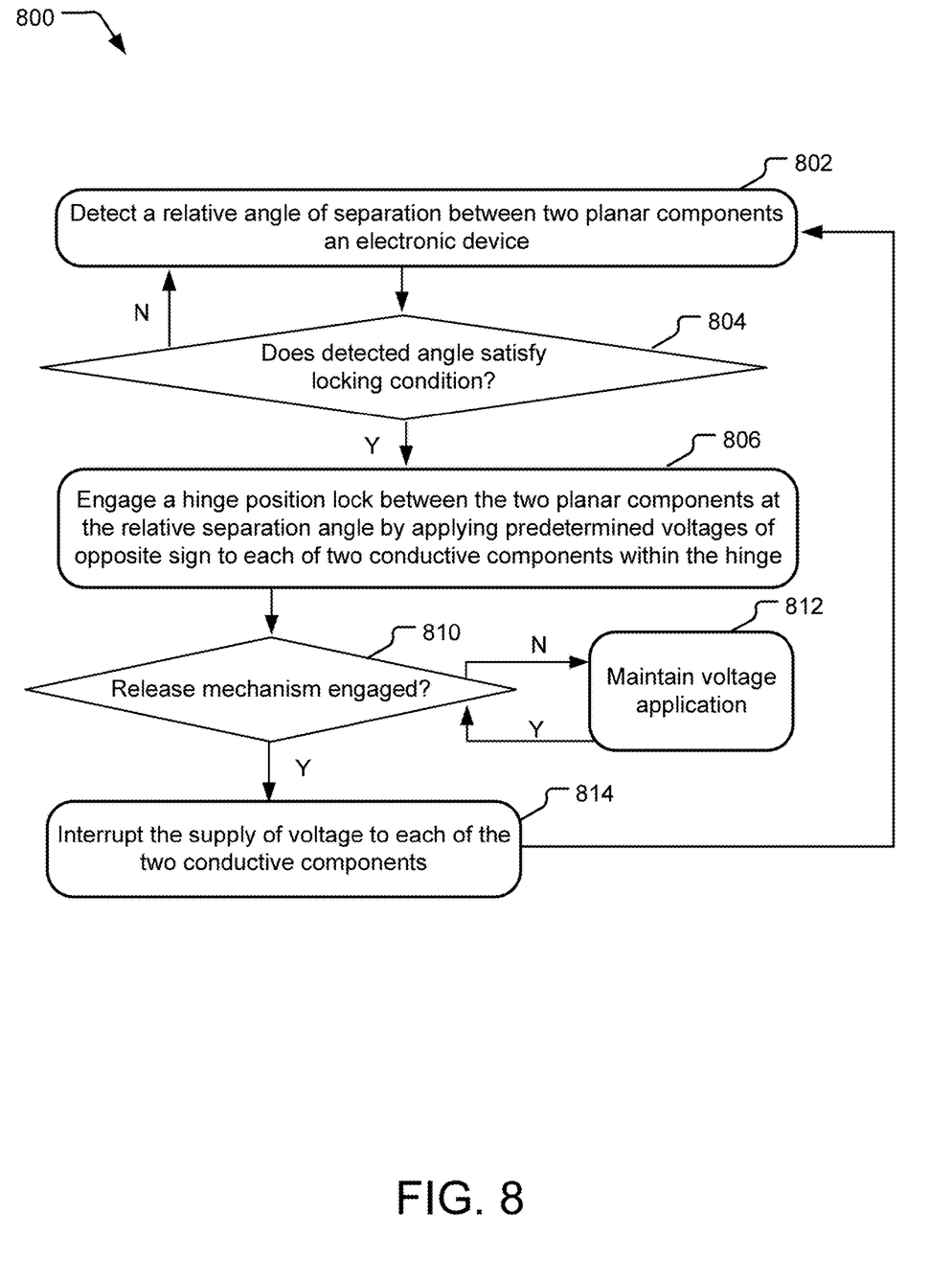
FIG. 8 illustrates example operations for using an electrostatic clutch to actively control an angle separation between two planar components an electronic device.

FIG. 8 illustrates example operations 800 for using an electrostatic clutch to actively control an angle separation between two planar components an electronic device. A detection operation 802 detects a relative angle of separation between the two planar components, such as using a bend sensor, strain sensor, force sensor, depth sensor, proximity sensor, or other sensing mechanism. A determination operation 804 determines whether the detected angle of separation between the two planar components satisfies a locking condition. For example, the locking condition may be satisfied when the detected angle of separation equals a threshold or is within a set range of angular values. If the detected angle of separation does not satisfy the locking condition, the detection operation 802 continues to actively detect changes in the angle of separation.

When the angle of separation satisfies the locking condition, a lock engagement mechanism 806 engages a hinge position lock between the two planar components at the detected angle of separation by applying predetermined voltages of opposite sign to each of two overlapping conductive components within a hinge that is included within an interface between the two planar components. The overlapping conductive components within the hinge are separated from one another by a dielectric material, and consequently, the applied voltages generate an attractive electrostatic force that locks the hinge in place to lock the two planar components in position relative to one another at the detected relative angle of separation.

A release mechanism determination operation 810 determines whether a release mechanism has been engaged by a user, such as through the push of a button, a "tug" on one or both of the two planar components, etc. Until the release mechanism is engaged, a voltage application operation 812 continues to continues to maintain the supply of the predetermined voltages. When the release mechanism determination operation 810 determines that the release mechanism has been engaged, an interrupt operation 814 interrupts the supply of voltage to each of the two conductive components allowing their voltages to return to zero. This voltage interrupt results in termination of the previously-generated electrostatic force, unlocking the hinge and again permitting free movement of the two planar components relative to one another.

Figure 9:
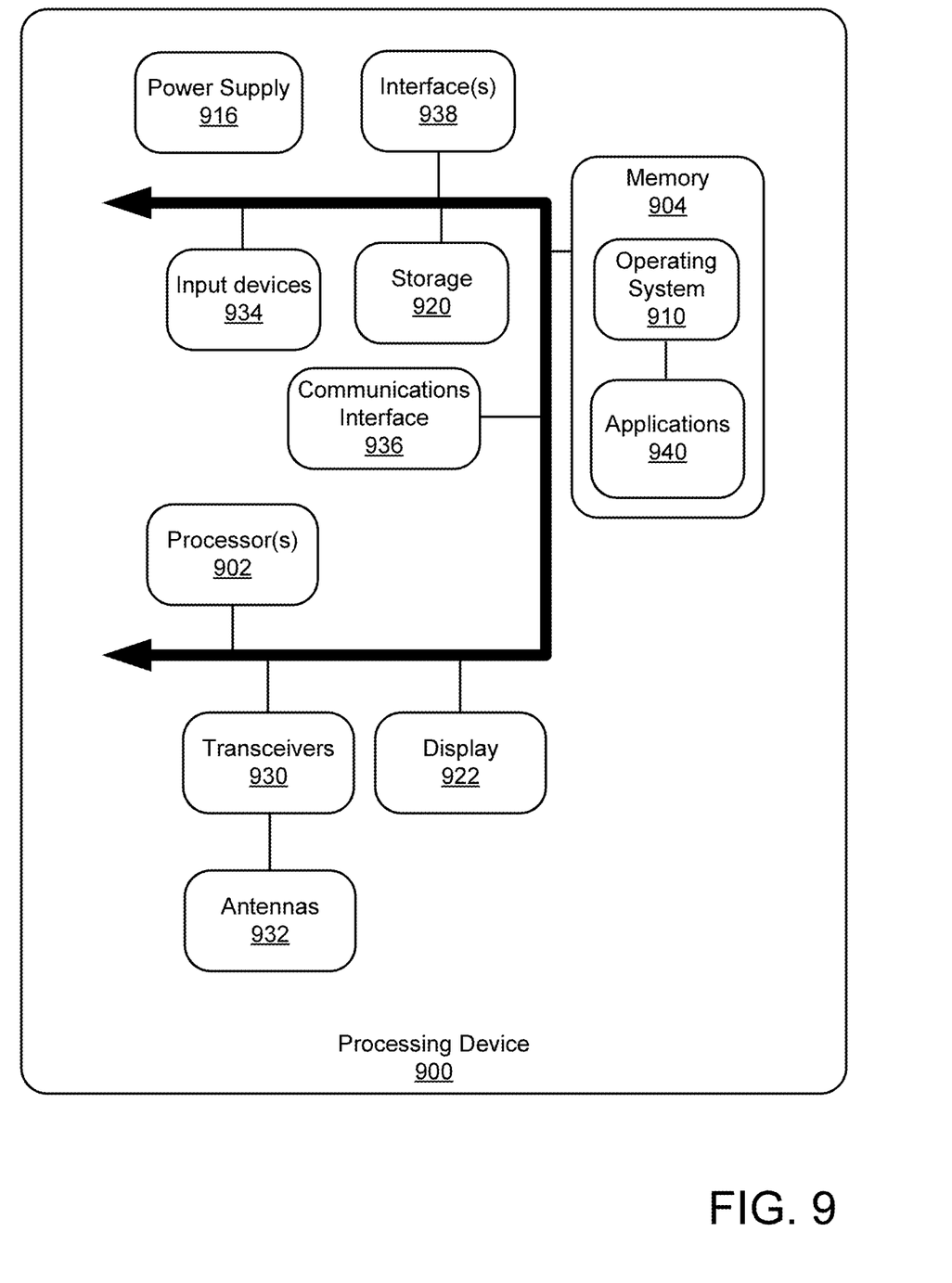
FIG. 9 illustrates an example schematic of a processing device that may be suitable for implementing aspects of the disclosed technology.

FIG. 9 illustrates an example schematic of a processing device 900 that may be suitable for implementing aspects of the disclosed technology. The processing device 900 includes one or more processor(s) 902, memory 904, a display 922, and other interfaces 938 (e.g., buttons). The memory 904 generally includes both volatile memory (e.g., RAM) and non-volatile memory (e.g., flash memory). An operating system 910, such as the Microsoft Windows® operating system, the Microsoft Windows® Phone operating system or a specific operating system designed for a gaming device, resides in the memory 904 and is executed by the processor(s) 902, although it should be understood that other operating systems may be employed.

One or more applications 940 are loaded in the memory 904 and executed on the operating system 910 by the processor(s) 902.

Applications 940 may receive input from various input local devices (not shown) such as a microphone, keypad, mouse, stylus, touchpad, joystick, etc. Additionally, the applications 940 may receive input from one or more remote devices, such as remotely-located smart devices, by communicating with such devices over a wired or wireless network using more communication transceivers 930 and an antenna 932 to provide network connectivity (e.g., a mobile phone network, Wi-Fi®, Bluetooth®).

The processing device 900 further includes storage 920 and a power supply 916, which is powered by one or more batteries and/or other power sources and which provides power to other components of the processing device 900. The power supply 916 may also be connected to an external power source (not shown) that overrides or recharges the built-in batteries or other power sources.

In an example implementation, aspects of the clutch control electronics (e.g., clutch voltage controller 124 of FIG. 1, relative angle detection mechanism 126 of FIG. 1, or clutch release mechanism 130 of FIG. 1) may be embodied by instructions stored in the memory 904 and/or storage devices 920 and processed by the processor unit(s) 902.

The processing device 900 may include a variety of tangible computer-readable storage media and intangible computer-readable communication signals. Tangible computer-readable storage can be embodied by any available media that can be accessed by the processing device 900 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 900. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example system disclosed herein includes a hinge mechanism for providing active control of a relative angle between two planar components. The hinge mechanism includes two conductive components on opposite sides of a dielectric layer; a relative angle detection mechanism usable to determine a relative angle between the two planar components; and a voltage controller that selectively applies a voltage to at least one of the two conductive components when the determined relative angle between the two planar components satisfies a predefined condition, the applied voltage creating an electrostatic force that restricts relative movement of the two conductive components and fixedly supports the two planar components at the determined relative angle of separation.

An example system according to any preceding system further comprises angled pins that separate a first portion of a first planar electronic device from a second portion of the first planar electronic device. The first portion of the first planar electronic device is configured to rotate relative to the second portion of the first planar electronic device about a hinge axis, and rotation of the first portion about the hinge axis rotates the angled pins to forcibly shift a position of the two conductive components relative to one another.

In another example system according to any preceding system, the relative angle detection mechanism determines the relative angle between the two planar components by measuring at least one of strain or force on the angled pins.

In yet still another example system according to any preceding system, the relative angle detection mechanism includes a bend sensor.

In still another example system of any preceding system, the two conductive components include a conductive inner cylinder and a conductive outer cylinder, the conductive inner cylinder being adapted to rotate within the conductive outer cylinder.

In yet still another example system of any preceding system, the conductive outer cylinder includes a first portion that attaches a first rigid flange and a second portion that attaches to a second rigid flange. The first portion is coupled to a first one of the two planar components and the second portion is coupled to a second one of the two planar components.

In still another example system of any preceding system, the two planar components include a keyboard and a display.

An example method disclosed herein includes determining a relative angle of separation between two planar components. A first one of the two planar components is adapted to pivot about a hinge axis relative to a second one of the two planar components. The method further provides for selectively applying voltage to at least one of the two conductive components separated from one another by a dielectric material in response to determining that the relative angle of separation satisfies a locking condition. The applied voltage creates an electrostatic force that restricts relative movement of the two conductive components to support the two planar components at the determined relative angle of separation.

In one example method according to any preceding method, the method further comprises rotating a mid-spine that is attached to a first one of the two planar components about a hinge axis and relative to a second one of the two planar components. The rotation of the mid-spine about the hinge axis causes a position shift of angled pins separating the two planar components that forcibly shifts a position of the two conductive components relative to one another.

In yet still another example method of any preceding method, the method further comprises determining the relative angle of separation between the two planar components by measuring at least one of strain or force on the angled pins.

In still another example method of any preceding method, the method further comprises determining the relative angle of separation based on a measurement of a bend sensor.

In yet still another example method of any preceding method, the two conductive components include a conductive inner cylinder and a conductive outer cylinder. The conductive inner cylinder is adapted to rotate within the conductive outer cylinder.

In another example method of any preceding method, the conductive outer cylinder includes a first portion that attaches a first rigid flange and a second portion that attaches to a second rigid flange. The first portion is coupled to a first one of the two planar components and the second portion is coupled to a second one of the two planar components.

In yet another example method of any preceding method, the two planar components include a keyboard and a display.

Another example system disclosed herein includes a first planar electronic device configured for attachment to a second planar electronic device via a hinge mechanism that provides active control of a relative angle between the first planar electronic device and the second planar electronic device. The hinge mechanism includes two conductive components on opposite sides of a dielectric layer; a relative angle detection mechanism usable to determine a relative angle between the first planar electronic device and the second planar electronic device; and a voltage controller that selectively applies a voltage to each of the two conductive components when the determined relative angle between the first planar electronic device and the second planar electronic device satisfies a locking condition. The applied voltage creates an electrostatic force that restricts relative movement of the two conductive components and fixedly supports the first planar electronic device and the second planar electronic device at the determined relative angle of separation.

In another example system of any preceding system, the system further comprises angled pins that separate a first portion of the first planar electronic device from a second portion of the first planar electronic device. The first portion of the first planar electronic device is configured to rotate relative to the second portion of the first planar electronic device about a hinge axis, and rotation of the first portion about the hinge axis rotates the angled pins to forcibly shift a position of the two conductive components relative to one another.

In still another example system of any preceding system, the relative angle detection mechanism determines the relative angle between the first planar electronic device and the second planar electronic device by measuring at least one of strain or force on the angled pins.

In yet still another example system of any preceding system, the relative angle detection mechanism includes a bend sensor.

In another example system of any preceding system, the two conductive components include a conductive inner cylinder and a conductive outer cylinder. The conductive inner cylinder is adapted to rotate within the conductive outer cylinder. The conductive outer cylinder includes a first portion that attaches a first rigid flange and a second portion that attaches to a second rigid flange, the first portion being coupled to the first planar electronic device and the second portion being coupled to the second planar electronic device.

Another example system disclosed herein includes a means for determining a relative angle of separation between two planar components where a first one of the two planar components is adapted to pivot about a hinge axis relative to a second one of the two planar components. The system also includes a means for selectively applying voltage to at least one of the two conductive components separated from one another by a dielectric material in response to determining that the relative angle of separation satisfies a locking condition. The applied voltage creates an electrostatic force that restricts relative movement of the two conductive components to support the two planar components at the determined relative angle of separation.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A system comprising:
a hinge mechanism for providing active control of a relative angle between two components, the hinge mechanism including:
two conductive components on opposite sides of a dielectric layer;
a relative angle detection mechanism usable to determine a relative angle between the two components; and
a voltage controller that selectively applies a voltage to at least one of the two conductive components when the determined relative angle between the two components satisfies a predefined condition, the applied voltage creating an electrostatic force that restricts relative movement of the two conductive components and fixedly supports the two components at the determined relative angle of separation.

2. The system of claim 1, further comprising:
angled pins that separate a first portion of a first electronic device from a second portion of the first electronic device, the first portion of the first electronic device being configured to rotate relative to the second portion of the first electronic device about a hinge axis, wherein rotation of the first portion about the hinge axis rotates the angled pins to forcibly shift a position of the two conductive components relative to one another.

3. The system of claim 2, wherein the relative angle detection mechanism determines the relative angle between the two components by measuring at least one of strain or force on the angled pins.

4. The system of claim 1, wherein the relative angle detection mechanism includes a bend sensor.

5. The system of claim 1, wherein the two conductive components include a conductive inner cylinder and a conductive outer cylinder, the conductive inner cylinder being adapted to rotate within the conductive outer cylinder.

6. The system of claim 5, wherein the conductive outer cylinder includes a first portion that attaches a first rigid flange and a second portion that attaches to a second rigid flange, the first portion being coupled to a first one of the two components and the second portion being coupled to a second one of the two components.

7. The system of claim 1, wherein the two components include a keyboard and a display.

8. A method comprising:
   determining a relative angle of separation between two components, a first one of the two components being adapted to pivot about a hinge axis relative to a second one of the two components; and
   in response to determining that the relative angle of separation satisfies a locking condition, selectively applying voltage to at least one of two conductive components separated from one another by a dielectric material, the applied voltage creating an electrostatic force that restricts relative movement of the two conductive components to support the two components at the determined relative angle of separation.

9. The method of claim 8, wherein the method further comprises:
   rotating a mid-spine that is attached to a first one of the two components about a hinge axis and relative to a second one of the two components, the rotation of the mid-spine about the hinge axis causing a position shift of angled pins separating the two components that forcibly shifts a position of the two conductive components relative to one another.

10. The method of claim 9, wherein the method further comprises:
    determining the relative angle of separation between the two components by measuring at least one of strain or force on the angled pins.

11. The method of claim 8, wherein the method further comprises:
    determining the relative angle of separation based on a measurement of a bend sensor.

12. The method of claim 8, wherein the two conductive components include a conductive inner cylinder and a conductive outer cylinder, the conductive inner cylinder being adapted to rotate within the conductive outer cylinder.

13. The method of claim 12, wherein the conductive outer cylinder includes a first portion that attaches a first rigid flange and a second portion that attaches to a second rigid flange, the first portion being coupled to a first one of the two components and the second portion being coupled to a second one of the two components.

14. The method of claim 8, wherein the two components include a keyboard and a display.

15. A system comprising:
    a first electronic device configured for attachment to a second electronic device via a hinge mechanism that provides active control of a relative angle between the first electronic device and the second electronic device, the hinge mechanism including:
    two conductive components on opposite sides of a dielectric layer;
    a relative angle detection mechanism usable to determine a relative angle between the first electronic device and the second electronic device; and
    a voltage controller that selectively applies a voltage to each of the two conductive components when the determined relative angle between the first electronic device and the second electronic device satisfies a locking condition, the applied voltage creating an electrostatic force that restricts relative movement of the two conductive components and fixedly supports the first electronic device and the second electronic device at the determined relative angle of separation.

16. The system of claim 15, further comprising:
    angled pins that separate a first portion of the first electronic device from a second portion of the first electronic device, the first portion of the first electronic device being configured to rotate relative to the second portion of the first electronic device about a hinge axis, wherein rotation of the first portion about the hinge axis rotates the angled pins to forcibly shift a position of the two conductive components relative to one another.

17. The system of claim 16, wherein the relative angle detection mechanism determines the relative angle between the first electronic device and the second electronic device by measuring at least one of strain or force on the angled pins.

18. The system of claim 15, wherein the relative angle detection mechanism includes a bend sensor.

19. The system of claim 15, wherein the two conductive components include a conductive inner cylinder and a conductive outer cylinder, the conductive inner cylinder being adapted to rotate within the conductive outer cylinder.

20. The system of claim 19, wherein the conductive outer cylinder includes a first portion that attaches a first rigid flange and a second portion that attaches to a second rigid flange, the first portion being coupled to the first electronic device and the second portion being coupled to the second electronic device.

* * * * *